Patented Nov. 11, 1947

2,430,450

UNITED STATES PATENT OFFICE 2,430,450

ANTISEPTIC UREA PEROXIDE-GLYCEROL SOLUTION

Ethan Allan Brown, Boston, Mass., Manuel H. Gorin, Dallas, Tex., and Harold A. Abramson, Chevy Chase, Md.

No Drawing. Application February 20, 1945, Serial No. 578,938

2 Claims. (Cl. 167—58)

The present invention relates to liquid antiseptics and particularly to antiseptics of the type which include hydrogen peroxide as the active agent.

The nature and value of hydrogen peroxide as an antiseptic has long been known, and numerous peroxide-containing liquid antiseptics have heretofore been available. Without exception, however, in the liquid antiseptics heretofore known and used, the hydrogen peroxide ingredients have been diffused through aqueous solutions. These are unstable in dilute solutions as normally used, since the oxygen is readily given off although the material is kept in an amber-colored bottle and in a cool place. Such solutions are undependable for bactericidal use since, with age, they deteriorate with great rapidity. Although freshly made, the action of the oxygen in aqueous solutions is transient, since it is liberated rapidly and leaves the solution and because it is in contact with the bacteria for an insufficient period of time to enable the active ingredients to accomplish effectively their intended bactericidal action, which is, therefore occasionally only bacteristatic. Since such aqueous solutions are free-flowing, their contact with bacteria is still more transient. The vehicles being, in any case, not hygroscopic, they do not wash the wound excepting superficially, nor do they promote healing.

The liquid antiseptic which comprises the subject matter for the present invention, and of which a peroxide compound is the active ingredient, consists of a solution of urea peroxide in a polyhydric alcohol, such as glycerol. This solution is completely stable at all temperatures, from below room temperature to a point close to 110° F., although kept in a clear bottle and in the presence of light. This liquid antiseptic thus includes a substance one function of which is to increase the viscosity of the solution and to prolong the period of contact between a body of the antiseptic placed upon the skin or tissue of the patient and the surface to be rendered sterile. This carrier liuqid, while causing the solution to have greater viscosity than that of water, and for that reason to possess a greater tendency to cling to the surface to be rendered sterile, nevertheless in no way lowers the effectiveness or efficiency of the antiseptic. The activation of the peroxide compound in the absence of water but the presence of a catalase, or its decomposition into its two ingredients, water and gaseous oxygen, is localized to the area of immediate contact between the body of the antiseptic and the tissue being treated.

In forming a stable antiseptic solution in accordance with the invention, the active ingredient, urea peroxide, may be introduced into the high viscosity carrier in any one of a number of different forms. Pure urea peroxide may be added to the carrier as a solid, as for instance, in powder form.

Such solution does not take place immediately upon mixing the two chief ingredients, the urea peroxide and the solvent, and, therefore, these cannot be used in any succession to obtain an additive effect of the separate ingredients. This solution does not, therefore, represent the cumulative effect of the separate constituents, since the urea peroxide is not easily wetted by the non-aqueous glycerine and, therefore, takes some hours to dissolve; the rate of solution being determined by the temperature, the viscosity of the solvent and the amount of agitation used, or both, as by the state of division of the urea peroxide and other factors. This solution depends upon the concentration of the urea peroxide. The addition of water would decompose the urea peroxide and is, therefore, not suitable for this purpose, giving a relatively less stable, less antiseptic, more caustic solution.

The carrier liquid may be any one of a number of non-aqueous liquids having the necessary physical characteristics, which will act as a solvent for the urea peroxide, and which will not inactivate the catalase or peroxidase in or on animal or vegetable tissue. Thus, polyhydric alcohols, other than glycerine, are suitable for this purpose, as, for instance, the glycols and other liquid polyhydric alcohols. Glycols which are especially suitable are propylene glycols, ethylene glycol, trimethylene glycol, tetramethylene glycol, etc. The carrier liquid which I prefer, however, is glycerol, this substance being highly viscous, receiving urea peroxide in solution and serving to hold the peroxide in solution in a satisfactory manner over long periods of time, as when it is in storage or transportation under the temperature conditions normally encountered. In addition to glycerol, various polyhydric alcohols may be employed, such, for instance, as ethylene glycol, propylene glycol and the like, to obtain solutions of higher or lower viscosity. For certain uses, other viscous solvents, such as esters, for instance those of phthalic acid, are effective carriers.

In addition to being a more stable peroxide compound, this antiseptic liquid has many other advantageous properties. The glycerols, glycols, and other vehicles listed—since they do not dry or evaporate—permit the antiseptic to remain in contact with a contaminated wound for a long period of time, thereby exerting a prolonged bactericidal effect. This is especially necessary for wounds contaminated with anaerobic spore-forming bacteria which are not killed except when in contact with the bactericidal liquid for some time. As the solutions do not dry, they are therefore capable of being used for prolonged periods of time without replenishment. A wet dressing with this material continues its effect for many hours without requiring change.

For example, when preparing patients for operation, this antiseptic may be applied to the site of the intended surgery the previous evening, and the patient subjected to surgical procedures the following morning with no further or additional preparation. This procedure has been followed in several hospitals on patients, the cultures taken from the skin before the application of the antiseptic showing bacterial growth, while those taken at the time of operation showed the skin to be bacteria-free. In contrast, antiseptics as at present used require several applications and, nevertheless, show positive bacterial contamination of the skin before operation.

Another advantage of this antiseptic solution is the fact that the glycerols and other polyhydric alcohols are hygroscopic. Being free of water, and absorbing water readily, they draw plasma from the deeper parts of the wound which are not normally reached by an antiseptic; the plasma pulling with it the bacteria, which are, therefore, subjected to bactericidal action. The usual antiseptics do not have this power and, therefore, do not sterilize the deeper parts of puncture wounds.

When the urea peroxide in glycerol breaks down into urea and hydrogen peroxide, the urea which is present acts as a peptizing and granulating agent supporting the healing of the damaged tissues. The urea has been used for many years for this purpose.

The use of this antiseptic, therefore, causes the following sequence of events to occur: a potent, stable, non-allergenic agent, urea peroxide in glycerol is applied to a wound. It is viscous and, therefore, stays in place. The peroxidase system in the blood plasma affects the urea peroxide-solution giving terminal solutions of urea and hydrogen peroxide, the latter giving off oxygen and remaining as water. The hygroscopic solution washes out of the wound by drawing plasma from its deeper parts, subjecting them to a long oxidizing action. The urea which remains peptizes dead tissue and promotes healing. The solution, being an oxidizing agent, is effective in this form against more types of bacteria than are affected by any known antiseptic, having shown clinical effectiveness against both gram-positive and gram-negative bacteria, as well as to aerobic and anaerobic organisms. No other known antiseptic is effective against all of these types of micro-organisms in this way.

When the urea peroxide is added to the glycerol in the form of a solid compound of urea and hydrogen peroxide the amount of urea peroxide added should be between about .2% and 20% of the solution, by weight, the amount of urea peroxide added being preferably between approximately 2% and 10%, by weight, of the total weight of the solution. The amounts of urea peroxide added will be subject to very considerable variations, depending upon the use to which the antiseptic is to be placed.

An antiseptic solution which comprises urea peroxide in solution with a high viscosity carrier has a number of very substantial advantages over those antiseptics which have heretofore been used or marketed and which included hydrogen peroxide as the active ingredient. When such an antiseptic solution is utilized, prolonged contact between hydrogen peroxide and the surface to be sterilized is brought about, as previously explained. The solution is stable, i. e., it will not lose strength due to breaking down of the hydrogen peroxide, even when stored for a considerable period of time in a closed vessel. This is true even when the solution is stored in a clear glass vessel which is exposed to light. Its stability may be shown by titration tests.

The cost of the antiseptic is low, both with respect to starting materials and formation of the final compound, and it may be used for all purposes for which an antiseptic of this character may be employed.

The term "non-aqueous" as applied to the antiseptic of the present invention designates one in which the water is present in minimum amount and insufficient of itself to destroy the stability of the urea peroxide.

Although in the concentrations mentioned a powerful antiseptic effect is achieved by the solution of urea peroxide in a non-aqueous glycerol-like solvent, nevertheless solvents containing small amounts of water may be used if the resulting hydrogen peroxide solution is sufficiently weak to be non-caustic and yet bacteristatic. Such solutions are sufficiently stable for short periods of time, and may be made from the antiseptic described by the addition of water.

Having thus described this invention, what is claimed as new and desired to be secured by Letters Patent is:

1. A non-aqueous antiseptic liquid composition, comprising substantially pure urea peroxide dissolved in glycerol.

2. A non-aqueous antiseptic liquid composition, comprising substantially pure urea peroxide dissolved in glycerol, the urea peroxide constituting from 0.2% to 20.0% by weight of the solution.

ETHAN ALLAN BROWN.
MANUEL H. GORIN.
HAROLD A. ABRAMSON.

REFERENCES CITED

The following references are of record in the file of this patent:

UNITED STATES PATENTS

| Number | Name | Date |
|---|---|---|
| 1,018,240 | Foregger | Feb. 20, 1912 |

OTHER REFERENCES

Reid et al., Annals of Surgery, Oct. 1943, pages 741 to 750, 167–63.

Extra pharmacopoeia, vol. 1, 22d ed. (1941), p. 612.

Combes, New York State Jour. of Med., vol. 37, pp. 1927, 1928 (Nov. 15, 1937) 167–72A.

Tritton, Quarterly Jour. and Yearbook of Phar. (1939), vol. 12, pp. 448, 449, 167–72A.

Synthetic Organic Chemicals (Carbide and Carbon), (1940) p. 15.